United States Patent
Sookraj

(10) Patent No.: US 10,711,095 B2
(45) Date of Patent: Jul. 14, 2020

(54) SYSTEMS AND METHODS FOR PRODUCING SUPERABSORBENT POLYMERS

(71) Applicant: Novomer, Inc., Boston, MA (US)

(72) Inventor: Sadesh H. Sookraj, Cambridge, MA (US)

(73) Assignee: Novomer, Inc., Rochester, NY (US)

(*) Notice: Subject to any disclaimer, the term of this patent is extended or adjusted under 35 U.S.C. 154(b) by 100 days.

(21) Appl. No.: 16/087,042

(22) PCT Filed: Mar. 21, 2017

(86) PCT No.: PCT/US2017/023303
§ 371 (c)(1),
(2) Date: Sep. 20, 2018

(87) PCT Pub. No.: WO2017/165345
PCT Pub. Date: Sep. 28, 2017

(65) Prior Publication Data
US 2019/0106532 A1    Apr. 11, 2019

Related U.S. Application Data

(60) Provisional application No. 62/311,275, filed on Mar. 21, 2016.

(51) Int. Cl.
*C08G 63/08* (2006.01)
*C08F 220/06* (2006.01)
(Continued)

(52) U.S. Cl.
CPC .............. *C08G 63/08* (2013.01); *B01D 3/009* (2013.01); *C08F 220/06* (2013.01); *C08G 63/78* (2013.01);
(Continued)

(58) Field of Classification Search
CPC ........ C08G 63/08; C08G 63/06; C08G 63/78; C08G 63/785; B01D 3/009; B01D 61/027;
(Continued)

(56) References Cited

U.S. PATENT DOCUMENTS 8,445,703 B2    5/2013  Allen et al.
8,796,475 B2    8/2014  Allen et al.
(Continued)

FOREIGN PATENT DOCUMENTS

WO          02/09781 A2      2/2002
WO    WO 02/09781 A2  *  2/2002
(Continued)

OTHER PUBLICATIONS

International Search Report and Written Opinion received for PCT Patent Application No. PCT/US17/23303, dated Jun. 7, 2017, 13 pages.

*Primary Examiner* — William K Cheung
(74) *Attorney, Agent, or Firm* — Young Basile Hanlon & MacFarlane, P.C.

(57) ABSTRACT

Provided herein are systems, and methods of using such systems, for producing superabsorbent polymers from ethylene oxide and carbon monoxide. The production systems have various unit operations, including, for example, a (β-propiolactone production system configured to produce (β-propiolactone from ethylene oxide and carbon monoxide and a superabsorbent polymer production system configured to produce superabsorbent polymers from (β-propio lactone and/or acrylic acid.

48 Claims, 6 Drawing Sheets

(51) Int. Cl.

| | | |
|---|---|---|
| *C08G 63/78* | (2006.01) | |
| *C08K 3/22* | (2006.01) | |
| *C08K 5/25* | (2006.01) | |
| *B01D 3/00* | (2006.01) | |
| B01D 61/02 | (2006.01) | |
| B01J 19/24 | (2006.01) | |
| C08K 5/00 | (2006.01) | |
| C08K 5/098 | (2006.01) | |

(52) U.S. Cl.
CPC .......... *C08G 63/785* (2013.01); *B01D 61/027* (2013.01); *B01J 19/246* (2013.01); *B01J 19/248* (2013.01); *C08K 3/22* (2013.01); *C08K 5/0025* (2013.01); *C08K 5/098* (2013.01)

(58) Field of Classification Search
CPC ...... C08F 220/06; B01J 19/246; B01J 19/248; C08K 3/22; C08K 5/0025; C08K 5/0098
USPC .......................................................... 526/64
See application file for complete search history.

(56) References Cited

U.S. PATENT DOCUMENTS

| | | |
|---|---|---|
| 9,096,510 B2 | 8/2015 | Porcelli et al. |
| 9,156,803 B2 | 10/2015 | Allen et al. |
| 9,206,144 B2 | 12/2015 | Allen et al. |
| 9,327,280 B2 | 5/2016 | Lee et al. |
| 9,403,788 B2 | 8/2016 | Lee et al. |
| 9,493,391 B2 | 11/2016 | Allen et al. |
| 9,914,689 B2 | 3/2018 | Porcelli et al. |
| 2005/0209411 A1 | 9/2005 | Nestler et al. |
| 2010/0323885 A1* | 12/2010 | Herfert .................. C08J 3/245 502/402 |
| 2012/0108695 A1 | 5/2012 | Won et al. |
| 2012/0123137 A1 | 5/2012 | Allen et al. |
| 2012/0189861 A1 | 7/2012 | Matsumoto et al. |
| 2012/0202951 A1 | 8/2012 | Gartner et al. |
| 2013/0072645 A1 | 3/2013 | Balduf et al. |
| 2013/0165670 A1 | 6/2013 | Allen et al. |
| 2013/0274697 A1 | 10/2013 | Godlewski et al. |
| 2013/0281715 A1 | 10/2013 | Allen et al. |
| 2014/0275575 A1 | 9/2014 | Allen et al. |
| 2014/0296522 A1 | 10/2014 | Lee et al. |
| 2014/0309399 A1 | 10/2014 | Porcelli et al. |
| 2015/0005513 A1 | 1/2015 | Lee et al. |
| 2015/0141693 A1 | 5/2015 | Allen et al. |
| 2015/0299083 A1 | 10/2015 | Porcelli et al. |
| 2015/0368394 A1 | 12/2015 | Allen |
| 2016/0016876 A1 | 1/2016 | Mahoney |
| 2016/0102040 A1 | 4/2016 | Allen et al. |
| 2016/0102068 A1 | 4/2016 | Allen et al. |
| 2016/0288057 A1 | 10/2016 | Lapointe et al. |
| 2017/0029352 A1 | 2/2017 | Sookraj et al. |
| 2017/0073463 A1 | 3/2017 | Lee et al. |
| 2017/0080409 A1 | 3/2017 | Farmer et al. |
| 2017/0096407 A1 | 4/2017 | Sookraj |
| 2017/0107103 A1 | 4/2017 | Sookraj et al. |
| 2017/0145126 A1 | 5/2017 | Mahoney |
| 2017/0225157 A1 | 8/2017 | Lee |
| 2017/0247309 A1 | 8/2017 | Porcelli et al. |
| 2018/0016219 A1 | 1/2018 | Farmer et al. |
| 2018/0022677 A1 | 1/2018 | Sookraj |
| 2018/0029005 A1 | 2/2018 | Sookraj |
| 2018/0030014 A1 | 2/2018 | Sookraj et al. |
| 2018/0030015 A1 | 2/2018 | Farmer et al. |
| 2018/0030201 A1 | 2/2018 | Farmer et al. |
| 2018/0057619 A1 | 3/2018 | Sookraj |
| 2018/0094100 A1 | 4/2018 | Farmer et al. |

FOREIGN PATENT DOCUMENTS

| | | |
|---|---|---|
| WO | 2010/118128 A1 | 10/2010 |
| WO | 2012/030619 A1 | 3/2012 |
| WO | 2012/158573 A1 | 11/2012 |
| WO | 2013/063191 A1 | 5/2013 |
| WO | 2013/122905 A1 | 8/2013 |
| WO | 2013/126375 A1 | 8/2013 |
| WO | 2014/004858 A1 | 1/2014 |
| WO | 2014/008232 A2 | 1/2014 |
| WO | 2015/085295 A2 | 6/2015 |
| WO | 2015/110321 A1 | 7/2015 |
| WO | WO 2015/110321 A1 * | 7/2015 |
| WO | 2015/138975 A1 | 9/2015 |
| WO | 2015/171372 A1 | 11/2015 |
| WO | 2015/184289 A1 | 12/2015 |
| WO | 2016/015019 A1 | 1/2016 |
| WO | 2016/130947 A1 | 8/2016 |
| WO | 2016/130977 A1 | 8/2016 |
| WO | 2016/130988 A1 | 8/2016 |
| WO | 2016/130993 A1 | 8/2016 |
| WO | 2016/130998 A1 | 8/2016 |
| WO | 2016/131001 A1 | 8/2016 |
| WO | 2016/131003 A1 | 8/2016 |
| WO | 2016/131004 A1 | 8/2016 |
| WO | 2017/023777 A1 | 2/2017 |
| WO | 2017/023820 A1 | 2/2017 |
| WO | 2017/165344 A1 | 9/2017 |
| WO | 2017/165345 A1 | 9/2017 |
| WO | 2018/085251 A1 | 5/2018 |
| WO | 2018/085254 A1 | 5/2018 |
| WO | 2018/136638 A1 | 7/2018 |
| WO | 2018/170006 A1 | 9/2018 |

* cited by examiner

SYSTEMS AND METHODS FOR PRODUCING SUPERABSORBENT POLYMERS

CROSS-REFERENCE TO RELATED APPLICATIONS

This application is a U.S. National Phase Patent Application of PCT/US2017/023303, filed Mar. 21, 2017, which claims priority to and the benefit of U.S. Provisional Patent Application No. 62/311,275, filed Mar. 21, 2016, each of which is incorporated herein by reference in its entirety.

FIELD

This disclosure relates to the production of superabsorbent polymers using ethylene oxide ("EO") and carbon monoxide ("CO") as starting materials. More specifically, this disclosure relates to the production of superabsorbent polymers from β-propiolactone ("BPL") using unit operations such as reactive distillation.

BACKGROUND

Superabsorbent polymers ("SAP") are polymers that can absorb liquids many times their own weight. Because the main characteristic of SAP is their ability to absorb and retain high levels of liquids, their predominant use is in hygiene products such as diapers, etc. As such, SAP plays an important role in everyday life.

SAP can be synthesized from a variety of monomers, although the most prevalent is acrylic acid. There are considerable differences between the major producers in their method of producing SAP. These differences result from the wide number of variables in SAP processes, including starting acrylic acid, initiator(s) used, cross-linker(s) used, reactor configuration, temperature and pressure of various equipment, as well many other factors. Typical SAP processes involve the copolymerization of acrylic acid, sodium acrylate, and a crosslinking agent to provide a minimally crosslinked polymer containing carboxyl and sodium carboxylate groups. Cross-linking during polymerization yields a networked polymer, which will not dissolve in water, and can absorb and retain water under low load.

As the demand for hygiene products continues with increased prosperity and an ageing population, the demand for SAP will continue. Furthermore, improvements in hygiene products are targeted towards improved SAP performance and thinner products, resulting in a decrease in the amount of SAP used per product.

BRIEF SUMMARY

Provided herein are systems, and methods of using such systems, for producing superabsorbent polymers from ethylene oxide and carbon monoxide. The production systems have various unit operations, including, for example, a β-propiolactone production system configured to produce β-propiolactone from ethylene oxide and carbon monoxide and a superabsorbent polymer production system configured to produce superabsorbent polymers from β-propiolactone and/or acrylic acid.

In some embodiments, a production system for superabsorbent polymers from ethylene oxide and carbon monoxide comprises a β-propiolactone production system comprising a first reactor comprising at least one inlet to receive carbon monoxide, ethylene oxide, carbonylation catalyst, and solvent; and at least one outlet for a first β-propiolactone stream comprising β-propiolactone, solvent, and carbonylation catalyst. The production system also can comprise a carbonylation catalyst recycling system configured to separate at least a portion of the carbonylation catalyst from the first β-propiolactone stream to produce a second β-propiolactone stream. In addition, the production system can also comprise a superabsorbent polymer production system comprising a second reactor comprising at least one inlet to receive the second β-propiolactone stream, a sodium containing component, and a crosslinking agent; and at least one outlet for a superabsorbent polymer stream comprising superabsorbent polymer. The second reactor can comprise at least one selected from the group of a distillation reactor, a loop reactor, or a continuous stirred-tank reactor (CSTR). The at least one inlet of the second reactor can also receive a chelating agent and/or a gelling agent. The sodium-containing component can comprise at least one selected from the group of NaOH, sodium acrylate, or sodium methacrylate and salts thereof. The production system can also include a β-propiolactone purification system between the carbonylation catalyst recycling system and the superabsorbent polymer production system configured to separate at least a portion of the solvent from the second β-propiolactone stream to produce a third β-propiolactone stream which is received by the at least one inlet of the second reactor instead of the second β-propiolactone stream.

In some embodiments, a production system for superabsorbent polymers comprises a distillation reactor comprising at least one inlet to receive β-propiolactone, a sodium-containing component, and a crosslinking agent; and at least one outlet for a superabsorbent polymer stream comprising superabsorbent polymer. The at least one inlet of the distillation reactor can also receive a chelating agent and/or a gelling agent. The sodium-containing component can also comprise at least one selected from the group of NaOH, sodium acrylate, or sodium methacrylate. The β-propiolactone can include solvent. The β-propiolactone and the sodium-containing component can be combined prior to entering the distillation reactor. The sodium-containing component and the crosslinking agent can be combined prior to entering the distillation reactor. The distillation reactor can contain a catalytic material. The distillation reactor can comprise separate inlets to receive the β-propiolactone, the sodium-containing component, and the crosslinking agent.

In some embodiments, a production system for superabsorbent polymers comprises a distillation reactor comprising at least one inlet to receive acrylic acid, a sodium-containing component, and a crosslinking agent; and at least one outlet for a superabsorbent polymer stream comprising superabsorbent polymer. At least one inlet of the distillation reactor can also receive a chelating agent and/or a gelling agent. The sodium-containing component can also comprise at least one selected from the group of NaOH, sodium acrylate, or sodium methacrylate. The acrylic acid and the sodium-containing component can be combined prior to entering the distillation reactor. The crosslinking agent and the sodium-containing component can be combined prior to entering the distillation reactor. The distillation reactor can contain a catalytic material. The distillation reactor can comprise separate inlets to receive the acrylic acid, the sodium-containing component, and the crosslinking agent.

In some embodiments, a production system for superabsorbent polymers comprises a loop reactor comprising at least one inlet to receive β-propiolactone, a sodium-containing component, and a crosslinking agent; and at least one outlet for a superabsorbent polymer stream comprising superabsorbent polymer. At least one inlet of the loop reactor can receive a chelating agent and/or a gelling agent. The sodium-containing component comprises sodium hydroxide, sodium acrylate, or sodium methacrylate, or any combinations thereof. The β-propiolactone can comprise solvent. The β-propiolactone and the sodium-containing component can be combined prior to entering the loop reactor. The sodium-containing component and the cross-linking agent can be combined prior to entering the loop reactor. At least one inlet of the loop reactor can receive a catalytic material. The at least one inlet of the loop reactor can also receive a diluent. The loop reactor can comprise a separate inlet to receive the β-propiolactone, the crosslinking agent, and the sodium-containing component.

In some embodiments, a production system for superabsorbent polymers comprises a loop reactor comprising at least one inlet to receive acrylic acid, a sodium-containing component, and a crosslinking agent; and at least one outlet for a superabsorbent polymer stream comprising superabsorbent polymer. At least one inlet of the loop reactor can receive a chelating agent and/or a gelling agent. The sodium-containing component comprises sodium hydroxide, sodium acrylate, or sodium methacrylate, or any combinations thereof. The acrylic acid and the sodium-containing component can be combined prior to entering the loop reactor. The sodium-containing component and the crosslinking agent can be combined prior to entering the loop reactor. At least one inlet of the loop reactor can receive a catalytic material. At least one inlet of the loop reactor can also receive a diluent. The loop reactor can comprise a separate inlet to receive the acrylic acid, the crosslinking agent, and the sodium-containing component.

In some embodiments, a production system for superabsorbent polymers from ethylene oxide and carbon monoxide comprises a β-propiolactone production system comprising a first reactor comprising at least one inlet to receive carbon monoxide, ethylene oxide, carbonylation catalyst, and solvent; and at least one outlet for a first β-propiolactone stream comprising β-propiolactone, solvent, and carbonylation catalyst. The production system also can comprise a carbonylation catalyst recycling system configured to separate at least a portion of the carbonylation catalyst from the first β-propiolactone stream to produce a second β-propiolactone stream. Furthermore, the production system can include an acrylic acid production system comprising at least one inlet to receive the second β-propiolactone stream and at least one outlet for an acrylic acid stream comprising acrylic acid. In addition, the production system can also comprise a superabsorbent polymer production system comprising a second reactor comprising at least one inlet to receive the acrylic acid stream, a sodium-containing component, and a cross-linking agent; and at least one outlet for a superabsorbent polymer stream comprising superabsorbent polymer. The second reactor can comprise at least one selected from the group of a distillation reactor, a loop reactor, or a continuous stirred-tank reactor. At least one inlet of the second reactor can also receive a chelating agent and/or a gelling agent. The sodium-containing component can comprise at least one selected from the group of sodium hydroxide, sodium acrylate, or sodium methacrylate. The sodium-containing component can be sodium hydroxide and the sodium hydroxide can include varying amounts of water. The production system can also include a β-propiolactone purification system between the carbonylation catalyst recycling system and the acrylic acid production system configured to separate at least a portion of the solvent from the second β-propiolactone stream to produce a third β-propiolactone stream which is received by the at least one inlet of the acrylic acid production system instead of the second β-propiolactone stream. The superabsorbent polymer stream can comprise solvent. The production system can also include a superabsorbent polymer purification system configured to separate at least a portion of the solvent from the superabsorbent polymer stream to produce a second superabsorbent polymer stream. The superabsorbent polymer stream can also comprise water. The production system can also include a superabsorbent polymer purification system configured to separate at least a portion of the solvent and water from the superabsorbent polymer stream to produce a second superabsorbent polymer stream.

DESCRIPTION OF FIGURES

The present application can be best understood by reference to the following description taken in conjunction with the accompanying figures, in which like parts may be referred to by like numerals.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Provided herein are systems and methods for the production of superabsorbent polymers ("SAP") from β-propiolactone ("BPL"). For example, ethylene oxide ("EO") may undergo a carbonylation reaction, e.g., with carbon monoxide ("CO"), in the presence of a carbonylation catalyst to produce BPL. The BPL may undergo polymerization in the presence of a polymerization catalyst to produce polypropiolactone ("PPL"). In addition, the PPL may undergo thermolysis to produce acrylic acid "AA", including, for example, glacial acrylic acid "GAA". The BPL, PPL, AA, or combinations thereof can be used to produce SAP.

Figure 1:
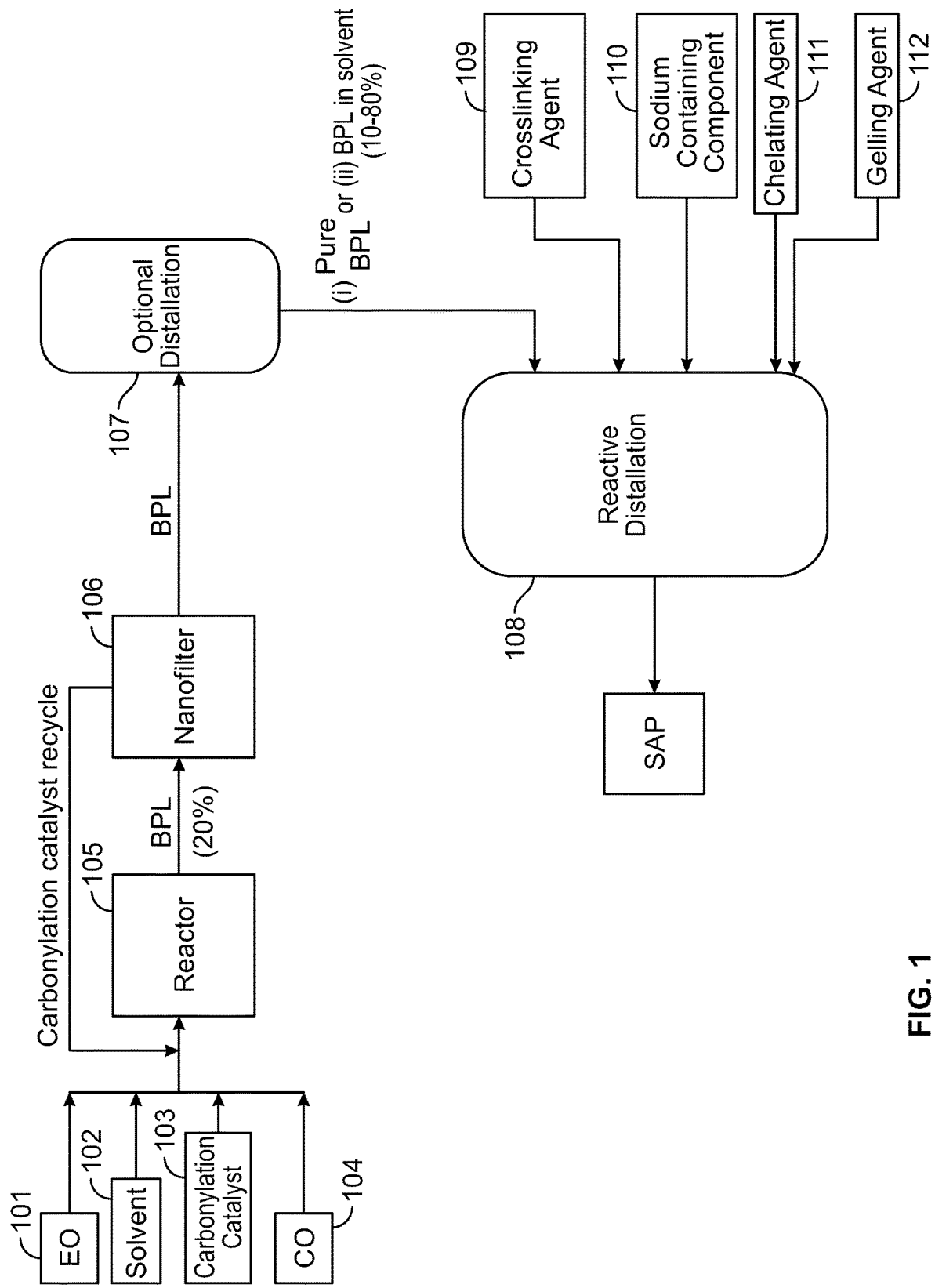
FIG. 1 is an exemplary schematic illustration of a system to produce superabsorbent polymers from carbon monoxide and ethylene oxide.

With reference to FIG. 1, an exemplary system to produce SAP from carbon monoxide and ethylene oxide is depicted. Carbon monoxide ("CO") source 104, carbonylation catalyst source 103, ethylene oxide ("EO") source 101, and solvent source 102 can be fed into a BPL production system, depicted as reactor 105 in FIG. 1. Reactor 105 can be at least one continuous stirred tank reactor, at least one loop reactor, at least one plug flow reactor, or a combination thereof in series or parallel. Such β-propiolactone production system can be typically configured to produce a liquid product stream of β-propiolactone. This liquid stream can contain at least about 10 wt % BPL, at least 15 wt % BPL, at least 20 wt % BPL, at least 25 wt. % BPL, or at least about 30 wt.

% BPL. In some embodiments, this liquid stream can include 10-40 wt. % BPL, 15-30 wt % BPL, or about 20 wt. % BPL. The BPL product stream can then be fed to a carbonylation catalyst recycle system, depicted as nanofilter 106 in FIG. 1. The carbonylation catalyst recycle system can be configured to separate residual carbonylation catalyst present in the β-propiolactone product stream, and such separated carbonylation catalyst may be recycled for use in reactor 105. Nanofilter 106 depicted in FIG. 1 may be any suitable membrane, such as a polymeric membrane or a ceramic membrane, and produces a retentate stream typically made up of β-propiolactone, solvent and residual carbonylation catalyst, and a permeate stream typically made up of β-propiolactone, solvent, small amounts of ethylene oxide, carbon monoxide, by-products (such as acetaldehyde and succinic anhydride) and trace amounts of carbonylation catalyst.

The permeate stream can be fed into a BPL purification system, depicted as optional distillation column 107 in FIG. 1, which can be configured to separate EO, CO, by-products, and solvent from the permeate stream. Distillation column 107 is optional, but not necessary. Accordingly, if distillation column 107 is used, the purified BPL stream from the BPL purification system is fed into distillation reactor 108 (i.e., a superabsorbent polymer production system). However, if distillation column 107 is not used, a BPL stream with solvent can be fed into reactive distillation reactor 108. This BPL stream with solvent can include about 5-90 wt % BPL or about 10-80 wt % BPL.

In addition, the BPL stream can be fed into an acrylic acid production system. Accordingly, an acrylic acid stream can be fed into distillation reactor 108 instead of a BPL stream.

Into distillation reactor 108, a crosslinking agent from crosslinking agent source 109 can be fed, a sodium-containing component from sodium-containing component source 110 can be fed, a chelating agent from chelating agent source 111 can be fed, and/or a gelling agent from gelling agent source 112 can be fed. In some embodiments, the BPL stream (or acrylic acid stream), the crosslinking agent, the sodium-containing component, the chelating agent, and/or the gelling agent can be mixed prior to being fed into the distillation reactor. For example, prior to distillation reactor 108, the BPL stream (or acrylic acid stream) and the sodium-containing component can be combined such that they are incorporated as a screw feed into the distillation reactor. In another embodiment, the sodium-containing component and the crosslinking agent can be combined prior to being fed into the distillation reactor. After reactive distillation, an SAP stream can be formed.

Ethylene Oxide Source

Ethylene oxide (EO) can be fed to an inlet(s) of the carbonylation reaction system. EO can be fed as a liquid using a pump or any other means known to those of ordinary skill in the art. In addition, the EO source can be maintained under an inert atmosphere. In some embodiments, the EO can be petroleum based. The petroleum based EO can be obtained via the oxidation of ethylene. Furthermore, the EO can be bio-based. The bio-based EO can be obtained from ethanol.

Solvent Source

The solvent may be selected from any solvents described herein, and mixtures of such solvents. In some variations, the solvent is an organic solvent. In certain variations, the solvent is an aprotic solvent.

In some embodiments, the solvent includes dimethylformamide, N-methyl pyrrolidone, tetrahydrofuran, toluene, xylene, diethyl ether, methyl-tert-butyl ether, acetone, methylethyl ketone, methyl-iso-butyl ketone, butyl acetate, ethyl acetate, dichloromethane, and hexane, and mixtures of any two or more of these. In general, polar aprotic solvents or hydrocarbons are suitable for this step.

Additionally, in one variation, β-lactone may be utilized as a co-solvent. In other variations, the solvent may include ethers, hydrocarbons and non protic polar solvents. In some embodiments, the solvent includes tetrahydrofuran ("THF"), sulfolane, N-methyl pyrrolidone, 1,3 dimethyl-2-imidazolidinone, diglyme, triglyme, tetraglyme, diethylene glycol dibutyl ether, isosorbide ethers, methyl tertbutyl ether, diethylether, diphenyl ether, 1,4-dioxane, ethylene carbonate, propylene carbonate, butylene carbonate, dibasic esters, diethyl ether, acetonitrile, ethyl acetate, dimethoxy ethane, acetone, and methylethyl ketone. In other embodiments, the solvent includes tetrahydrofuran, tetrahydropyran, 2,5-dimethyl tetrahydrofuran, sulfolane, N-methyl pyrrolidone, 1,3 dimethyl-2-imidazolidinone, diglyme, triglyme, tetraglyme, diethylene glycol dibutyl ether, isosorbide ethers, methyl tertbutyl ether, diethylether, diphenyl ether, 1,4-dioxane, ethylene carbonate, propylene carbonate, butylene carbonate, dibasic esters, diethyl ether, acetonitrile, ethyl acetate, propyl acetate, butyl acetate, 2-butanone, cyclohexanone, toluene, difluorobenzene, dimethoxy ethane, acetone, and methylethyl ketone. In certain variations, the solvent is a polar donating solvent. In one variation, the solvent is THF.

Introduction of a low boiling solvent that does not hinder polymerization, such as THF, can provide additional advantages to the SAP production process. First, the low boiling solvent can help effectively manage heat generated during the polymerization process. A uniform heat distribution can allow for the production of better polymer (i.e., more uniform particle size distribution, etc.). Second, the low boiling solvent can ease the processing of SAP. Lastly, the low boiling solvent may lower the cost associated with drying the SAP (i.e., lower cost of boiling off solvent when compared to water).

Solvent can be fed to the carbonylation reaction system using a pump. In addition, the solvent streams, sources, and storage tanks can be maintained under an inert or CO atmosphere. In some embodiments, the solvent feed that supplies solvent to the carbonylation reaction system can include solvent from fresh solvent source, recycled solvent from the BPL purification system, and/or solvent in recycled carbonylation catalyst stream from the carbonylation catalyst isolation system. In some embodiments, the recycled solvent from the BPL purification system can be stored in a make-up solvent reservoir. In some embodiments, the solvent feed that supplies solvent to the carbonylation reaction system can include solvent from the make-up solvent reservoir. In some embodiments, solvent can be purged from the system. In some embodiments, the purged solvent can be solvent from the recycled solvent of the BPL purification system. In some embodiments, solvent from the fresh solvent source is also stored into the make-up solvent reservoir to dilute the recycled solvent from the BPL purification system with fresh solvent. In some embodiments, fresh solvent is fed from the fresh solvent source to the make-up solvent reservoir prior to entering the carbonylation reaction system. In some embodiments, solvent from the fresh solvent source, the BPL purification system, and the carbonylation catalyst isolation system can be purified by operations such as adsorption to remove oxygen and water that can inhibit the carbonylation catalyst.

Carbonylation Catalyst Source

Numerous carbonylation catalysts known in the art are suitable for (or can be adapted to) methods of the present invention. For example, in some embodiments, the carbonylation methods utilize a metal carbonyl-Lewis acid catalyst such as those described in U.S. Pat. No. 6,852,865. In other embodiments, the carbonylation step is performed with one or more of the carbonylation catalysts disclosed in U.S. patent application Ser. Nos. 10/820,958; and 10/586,826. In other embodiments, the carbonylation step is performed with one or more of the catalysts disclosed in U.S. Pat. Nos. 5,310,948; 7,420,064; and 5,359,081. Additional catalysts for the carbonylation of epoxides are discussed in a review in Chem. Commun., 2007, 657-674.

In some embodiments, the carbonylation catalyst includes a metal carbonyl compound. Typically, a single metal carbonyl compound is provided, but in some embodiments, mixtures of two or more metal carbonyl compounds are provided. Thus, when a provided metal carbonyl compound "comprises", e.g., a neutral metal carbonyl compound, it is understood that the provided metal carbonyl compound can be a single neutral metal carbonyl compound, or a neutral metal carbonyl compound in combination with one or more metal carbonyl compounds. Preferably, the provided metal carbonyl compound is capable of ring-opening an epoxide and facilitating the insertion of CO into the resulting metal carbon bond. Metal carbonyl compounds with this reactivity are well known in the art and are used for laboratory experimentation as well as in industrial processes such as hydroformylation.

In some embodiments, a provided metal carbonyl compound comprises an anionic metal carbonyl moiety. In other embodiments, a provided metal carbonyl compound comprises a neutral metal carbonyl compound. In some embodiments, a provided metal carbonyl compound comprises a metal carbonyl hydride or a hydrido metal carbonyl compound. In some embodiments, a provided metal carbonyl compound acts as a pre-catalyst which reacts in situ with one or more reaction components to provide an active species different from the compound initially provided. Such pre-catalysts are specifically encompassed as it is recognized that the active species in a given reaction may not be known with certainty; thus the identification of such a reactive species in situ does not itself depart from the spirit or teachings of the present disclosure.

In some embodiments, the metal carbonyl compound comprises an anionic metal carbonyl species. In some embodiments, such anionic metal carbonyl species have the general formula $[Q_dM'_e(CO)_w]^{y-}$, where Q is any ligand and need not be present, M' is a metal atom, d is an integer between 0 and 8 inclusive, e is an integer between 1 and 6 inclusive, w is a number such as to provide the stable anionic metal carbonyl complex, and y is the charge of the anionic metal carbonyl species. In some embodiments, the anionic metal carbonyl has the general formula $[QM'(CO)_w]^{y-}$, where Q is any ligand and need not be present, M' is a metal atom, w is a number such as to provide the stable anionic metal carbonyl, and y is the charge of the anionic metal carbonyl.

In some embodiments, the anionic metal carbonyl species include monoanionic carbonyl complexes of metals from groups 5, 7 or 9 of the periodic table or dianionic carbonyl complexes of metals from groups 4 or 8 of the periodic table. In some embodiments, the anionic metal carbonyl compound contains cobalt or manganese. In some embodiments, the anionic metal carbonyl compound contains rhodium. Suitable anionic metal carbonyl compounds include, but are not limited to: $[Co(CO)_4]^-$, $[Ti(CO)_6]^{2-}$ $[V(CO)_6]^-$ $[Rh(CO)_4]^-$, $[Fe(CO)_4]^{2-}$ $[Ru(CO)_4]^{2-}$, $[Os(CO)_4]^{2-}$ $[Cr_2(CO)_{10}]^{2-}$ $[Fe_2(CO)_8]^{2-}$ $[Tc(CO)_5]^-$ $[Re(CO)_5]^-$ and $[Mn(CO)_5]^-$. In some embodiments, the anionic metal carbonyl comprises $[Co(CO)_4]^-$. In some embodiments, a mixture of two or more anionic metal carbonyl complexes may be present in the carbonylation catalysts used in the methods.

Carbon Monoxide Source

The carbon monoxide can be fed into the BPL production system at an amount sufficient to carbonylate EO to produce BPL. In some variations, this may be achieved performing the carbonylation reaction under a superatmospheric pressure of carbon monoxide. In some embodiments, the carbon monoxide is petroleum based. The petroleum based carbon monoxide can be obtained from various processes such as gasification. In some embodiments, the carbon monoxide is renewable. Renewable carbon monoxide can be obtained from either MSW/biomass gasification or other technologies that convert CO2 to CO (e.g., Praxair/Haldo-Topsoe).

In some embodiments, the carbon monoxide source that supplies carbon monoxide to the carbonylation reaction system can include fresh carbon monoxide source (i.e., main CO feed) and recycled carbon monoxide stream from the carbonylation reaction system. In some embodiments, the carbon monoxide source can be only the fresh carbon monoxide source. In some embodiments, the carbon monoxide source can be only the recycled carbon monoxide. In some embodiments, fresh carbon monoxide stream and/or the recycled carbon monoxide streams can be fed into carbon monoxide compressor prior to the resultant stream from the carbon monoxide compressor (i.e., reactor carbon monoxide inlet stream) being fed into the carbonylation reaction system. In some embodiments, resultant stream from the carbon monoxide compressor (i.e., reaction system carbon monoxide inlet stream) can be the carbon monoxide source. The carbon monoxide source can be compressed to the pressure at or above the carbonylation reaction system pressure and then fed to the carbonylation system. In some embodiments, the fresh carbon monoxide source (i.e., main CO feed) and the recycled carbon monoxide can be compressed in separate compressors. One reason recycled carbon monoxide can be compressed separately from the fresh carbon monoxide feed (i.e., main CO feed) to reaction system pressure is to avoid contamination of the main compressor (i.e., fresh feed compressor) with hazardous components such as ethylene oxide and BPL that may be present in the carbon monoxide recycle stream. Some of these potentially hazardous components may be removed from the compressor as partially liquefied components as waste. In some embodiments, these potentially hazardous components can also be recycled to the carbonylation reaction system. In some embodiments, the compressed carbon monoxide from both compressors can be fed to the carbonylation reaction system as the reaction system carbon monoxide inlet stream.

Crosslinking Agent Source

The crosslinking agent sources disclosed herein can be those suitable for use in the production of SAP. Suitable crosslinking agents may include, for example, trimethylolpropane triacrylate, tetraallyloxyethane, allylmethacrylate, triallylamine, ethylene glycol diglycidyl ether, N,N'-methylenebisaerylamide, N,N'-methylenebisrnethacrylamide, ethylene glycol dimmethacrylate, diethylene glycol diacrylate, and trimethylolpropane triacrylate. Any combinations of the crosslinking agents described herein may be used. The crosslinking agents may also be used in various amounts and concentrations.

Sodium-Containing Component Source

The sodium-containing component sources disclosed herein can be those suitable for use in the production of SAP.

Specifically, the sodium-containing components can include sodium hydroxide, sodium acrylate, sodium methacrylate, salts thereof, or combinations thereof. In addition, the sodium-containing component can include SAP initiators known in the art. The sodium-containing components can act as an initiator for the ring opening of BPL. In addition, the sodium-containing components can provide excess sodium ions that are advantageous for the absorbing properties of the final SAP. Furthermore, the sodium-containing component can act as a neutralizing agent for the SAP polymer and/or acrylic acid in the production of SAP. The sodium-containing components can be used in various amounts and concentrations.

Chelating Agent Source

The chelating agent sources disclosed herein can be those suitable for use in the production of SAP. The chelating agents can be used in various amounts and concentrations.

Gelling Agent Source

The gelling agent sources disclosed herein can be those suitable for use in the production of SAP. The gelling agents can be used in various amounts and concentrations.

Reactive Distillation

Figure 2:
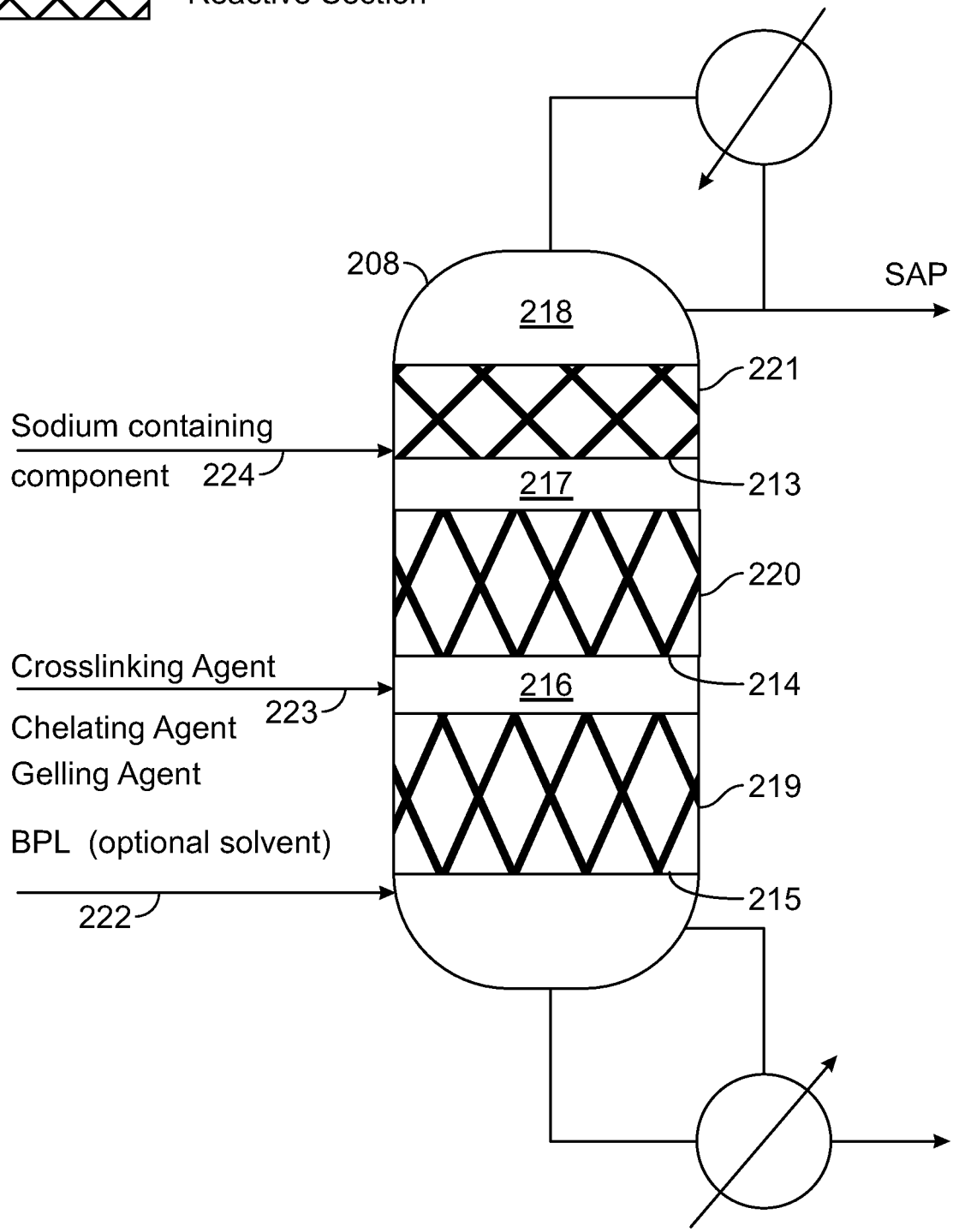
FIG. 2 is an exemplary distillation reactor disclosed herein.

Referring to FIG. 2, exemplary distillation reactor 208 (i.e., an exemplary superabsorbent polymer production system) to produce SAP from BPL (or acrylic acid) is depicted. The distillation rector can include a reaction vessel, which can follow the shape of any of the various distillation columns and mass transfer reactors known in the art. Positioned inside of reactor 208 can be a single tray (not shown) or a plurality of trays (213, 214, 215), which can define the lower boundaries of a plurality of reaction chambers (216, 217, 218) or the lower boundary of a single reaction chamber. Materials commonly used in distillation columns to assist in the distillation process may be used in reactor 208 as a matter of engineering design choice and optimization.

Positioned above the tray or trays can be catalytic materials (219, 220, 221). The catalytic materials can comprise all the necessary components of a SAP synthesis catalyst or catalyst system. Thus, active catalytic components such as catalytically active metals for SAP synthesis and their precursor and derivative compounds can be included in the SAP synthesis catalyst or catalyst system. Catalyst support materials, as are well known in the art, can also be included within the catalytic material. Promoters, activators, and other materials can also be included in the catalytic materials. In addition, non-catalytic distillation packing or the like can be used in conjunction with the catalytic materials. In some embodiments, one or more reaction chambers may have no catalyst material present. Catalytic materials may be present in different amounts, concentrations, forms, and configurations in each reaction chamber. The distillation reactor preferably uses catalyst active for SAP synthesis. However, there is no particular catalyst type that must be used in the reactor. In one embodiment, the active catalyst components in the catalyst material include any metal known to be active for the production of SAP. A form of the desired catalyst material can be prepared by any of the methods known to those skilled in the art. The catalyst material, its physical form, and the concentration of its contents can be optimized in each reaction chamber so as to result in a desired reaction scheme. Indeed, the catalyst material can be selected for each reaction chamber so as to optimize the reactions occurring in said reaction chamber. For example, the catalytic material included in distillation reactor can include catalysts that can catalyze the reaction of BPL→PPL; PPL→AA; and/or AA→SAP.

A plurality of feed lines can be used for feeding desired reactants into the reactor 208. Although three feed lines are shown, any number of feed lines, more or fewer than three, may be used. Furthermore, some of these feed lines can be combined with one another prior to entering the reactor. In addition, each of the feed lines can enter the reactor into a reaction chamber as shown in FIG. 2. In other embodiments, the feed lines can be positioned according to a variety of configurations so as to achieve certain desired effects. For example, all feed lines may enter the reactor in one reaction chamber. Compressors, heaters, and the like can be provided on the feed lines so that the feed materials can be preheated, cooled, and pressurized if desired. For example, it may be desirable to preheat and pressurize the feed materials such that they enter the reactor at conditions compatible with those of the reactor at their entry point.

In operation, reactants and other processing materials, if any, can enter reactor 208 through feed lines. In one embodiment, BPL feed line (or AA feed line) 222, agent feed line 223, and sodium-containing component feed line 224 can enter reactor 208. In addition, there can be more than one BPL feed line, more than one agent feed line, more than one sodium-containing component feed line and each of these different feed lines can enter at various reaction chambers of the reactor. As stated above, these feed lines can enter the same or different reaction chambers. BPL feed line (or AA feed line) 222 can come from a BPL production system (or AA production system) described above. Agent feed line can come from a crosslinking agent source, a chelating agent source, a gelling agent source, or a combination thereof. In addition, there can be multiple agent feed lines (e.g., one for each agent). Sodium-containing component feed line can come from a sodium-containing component source. The BPL feed line can include purified BPL or can include BPL in solvent. In some embodiments, the BPL feed line (or AA feed line) and the sodium-containing feed line can be incorporated as a screw feed section before the distillation reactor. For example, the BPL feed line can combine with a sodium-containing component feed line comprising sodium acrylate (or other sodium salt) prior to entering the reactor. In addition, there can be more than one BPL feed line (or AA feed line), more than one agent feed line, more than one sodium-containing component feed line, more than one diluent feed line, and more than one catalyst feed line and each of these different feed lines can enter at various or the same points of the reactor.

In one embodiment, a BPL feed line (or AA feed line) and a sodium-containing feed line (either combined or individually) can enter at a location of a distillation reactor (e.g., the bottom of the distillation reactor), an agent feed line can enter at a location different from BPL feed line (or AA feed line) and sodium-containing feed line location (e.g., above the BPL (or AA feed line) and sodium-containing entrance), and another sodium-containing component feed line can enter at a location different from the agent feed line (e.g., above the agent feed line entrance). In some embodiments, the sodium-containing feed line and the agent feed line can be combined prior to entering the reactor. For example, a BPL feed line (or AA feed line) and a sodium-containing feed line (either combined or individually) can enter at a location of a distillation reactor and a combined agent and sodium-containing component feed line can enter at a location different from BPL (or AA feed line) and sodium-containing feed line location. In some embodiments, the agent feed line can be split into separate feed lines for each individual agent (i.e., crosslinking feed line, a chelating feed line, and a gelling feed line, etc.).

The concentrations of feed materials and their injection points, the reaction temperatures, and pressures, and the catalyst types and amount of catalyst used (if any) in various reaction chambers in the distillation reactor may all be varied in accordance with the present invention to control the production distribution, conversion, and selectivity. In one embodiment, the components of the distillation column are configured such that SAP is produced from the distillation column.

One important aspect in making high quality SAP is an efficient heat management system. Accordingly, reactor 208 can include heat exchangers for efficient cooling. Traditional SAP producers use aqueous sodium hydroxide to manage heat evolution. However, this can leave those producers with the problem of removing water at the end of the process. For example, typically 50% of the weight is water and it can be very costly to remove water to obtain dry SAP. The present application can use crosslinking agents as well as other agents (e.g., chelating and/or gelling agents) in varying concentrations, a sodium-containing component, and can manage heat through effective cooling as well as the introduction of low boiling solvents like THF, for example.

Other Reactors

Although only a single distillation reactor is illustrated by FIG. 2, multiple distillation reactors (series or parallel) can be used to perform the SAP synthesis. Besides distillation reactors, other reactors such as loop reactors, continuous stirred-tank reactors (CSTR), or plug flow reactors can be used to perform the SAP synthesis.

Figure 3:
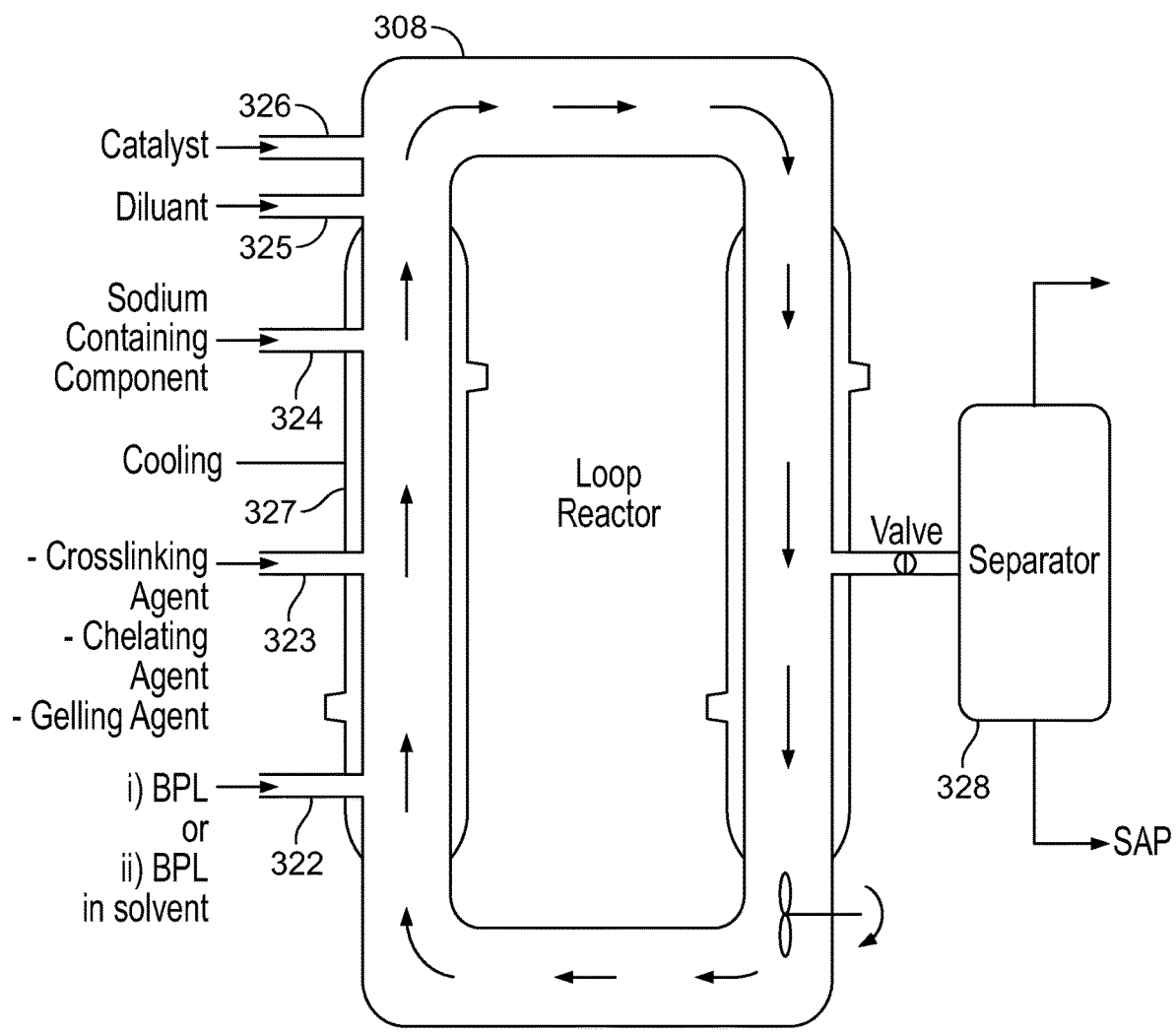
FIG. 3 is an exemplary loop reactor disclosed herein.

For example, FIG. 3 depicts an exemplary loop reactor 308 (i.e., another exemplary superabsorbent polymer production system) to produce SAP from BPL (or AA). Similar to the distillation reactor, a plurality of feed lines can enter the loop reactor. A plurality of feed lines can be used for feeding desired reactants into the reactor 308. Although five feed lines are shown, any number of feed lines, more or fewer than five, may be used. Furthermore, some of these feed lines can be combined with one another prior to entering the reactor. In other embodiments, the feed lines can be positioned according to a variety of configurations so as to achieve certain desired effects. Compressors, heaters, and the like can be provided on the feed lines so that the feed materials can be preheated, cooled, and pressurized if desired. For example, it may be desirable to preheat and pressurize the feed materials such that they enter the reactor at conditions compatible with those of the reactor at their entry point.

In operation, reactants and other processing materials, if any, can enter reactor 308 through feed lines. In one embodiment, BPL feed line (or AA feed line) 322, agent feed line 323, sodium-containing component feed line 324, diluent feed line 325, and/or catalyst feed line 326 can enter reactor 308. The diluent can be a liquid that dilutes the reactants (and products) and carries them throughout the loop reactor. Preferably, the reactants and/or products do not dissolve in the diluent. In some embodiments, a diluent is not needed. In addition, there can be more than one BPL feed line (or AA feed line), more than one agent feed line, more than one sodium-containing component feed line, more than one diluent feed line, and more than one catalyst feed line and each of these different feed lines can enter at various or the same points of the reactor. BPL feed line 222 (or AA feed line) can come from a BPL production system (or AA production system) described above. Agent feed line can come from a crosslinking agent source, a chelating agent source, a gelling agent source, or a combination thereof. Sodium-containing component feed line can come from a sodium-containing component source. The diluent feed line can come from a diluent source. The catalyst feed line can come from a catalytic material source. As discussed above, catalytic materials can comprise all the necessary components of a SAP synthesis catalyst or catalyst system. Thus, active catalytic components such as catalytically active metals for SAP synthesis and their precursor and derivative compounds can be included in the SAP synthesis catalyst or catalyst system. Catalyst support materials, as are well known in the art, can also be included within the catalytic material. Promoters, activators, and other materials can also be included in the catalytic materials. In some embodiments, the loop reactor does not have a catalyst. Catalytic materials may be present in different amounts, concentrations, forms, and configurations in the loop reactor. The loop reactor preferably uses catalyst active for SAP synthesis. For example, the catalytic material included in the loop reactor can include catalysts that can catalyze the reaction of BPL→PPL; PPL→AA; and/or AA→SAP. However, any suitable catalyst type may be used in the reactor. In one embodiment, the active catalyst components in the catalyst material include any metal known to be active for the production of SAP. A form of the desired catalyst material can be prepared by any of the methods known to those skilled in the art. The catalyst material, its physical form, and the concentration of its contents can be optimized so as to result in a desired reaction scheme. Indeed, the catalyst material can be selected so as to optimize the reactions occurring in said loop reactor.

The BPL feed line can include purified BPL or can include BPL in solvent. In some embodiments, the BPL feed line (or AA feed line) and the sodium-containing feed line can be combined before the loop reactor. In some embodiments, the sodium-containing feed line and the agent feed line can be combined prior to entering the loop reactor.

The concentrations of feed materials and their injection points, the reaction temperatures, and pressures, and the catalyst types and amount of catalyst used (if any) in the loop reactor may all be varied in accordance with the present invention to control the production distribution, conversion, and selectivity. In one embodiment, the components of the loop reactor are configured such that SAP is produced from the loop reactor.

In addition, the loop reactor can include a cooling jacket 327 to manage heat. In addition, the loop reactor can include a separator 328 in order to separate the product SAP from other components of the loop reactor.

EO→CO→BPL→AA→SAP

Although the previous figures have all shown a BPL feed line entering a reactor, this BPL feed line can be replaced with an acrylic acid feed line as mentioned above. Accordingly, in all previous embodiments where a BPL feed line has entered a distillation reactor, a loop reactor, etc., this feed line can instead be an acrylic acid feed line. This process for the production of acrylic acid can be used with any of the distillation reactors, loop reactors, or other reactors disclosed herein in order to produce SAP.

Figure 4A:
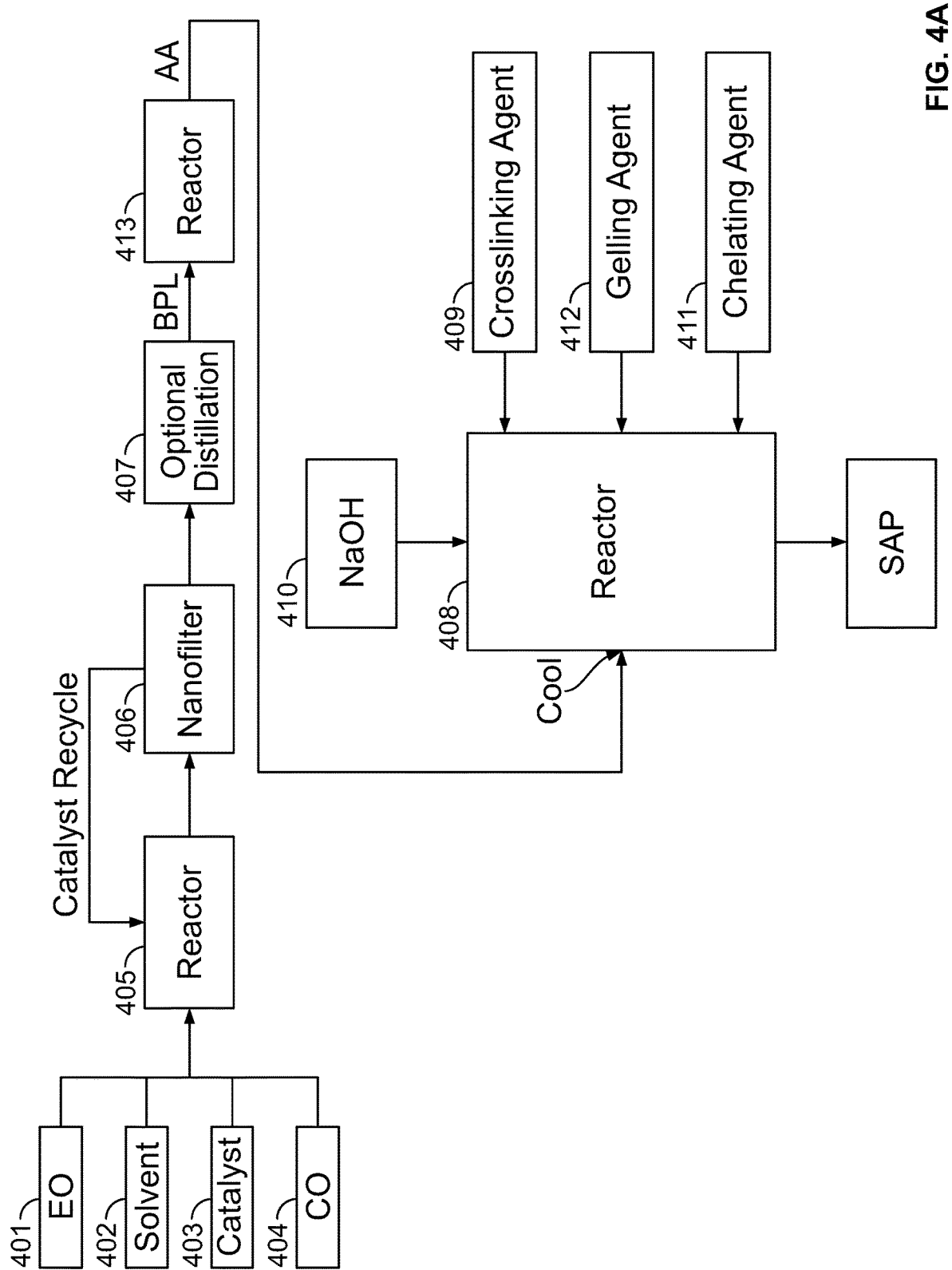
FIG. 4A is an exemplary schematic illustration of a system to produce superabsorbent polymers using sodium hydroxide.
Figure 4B:
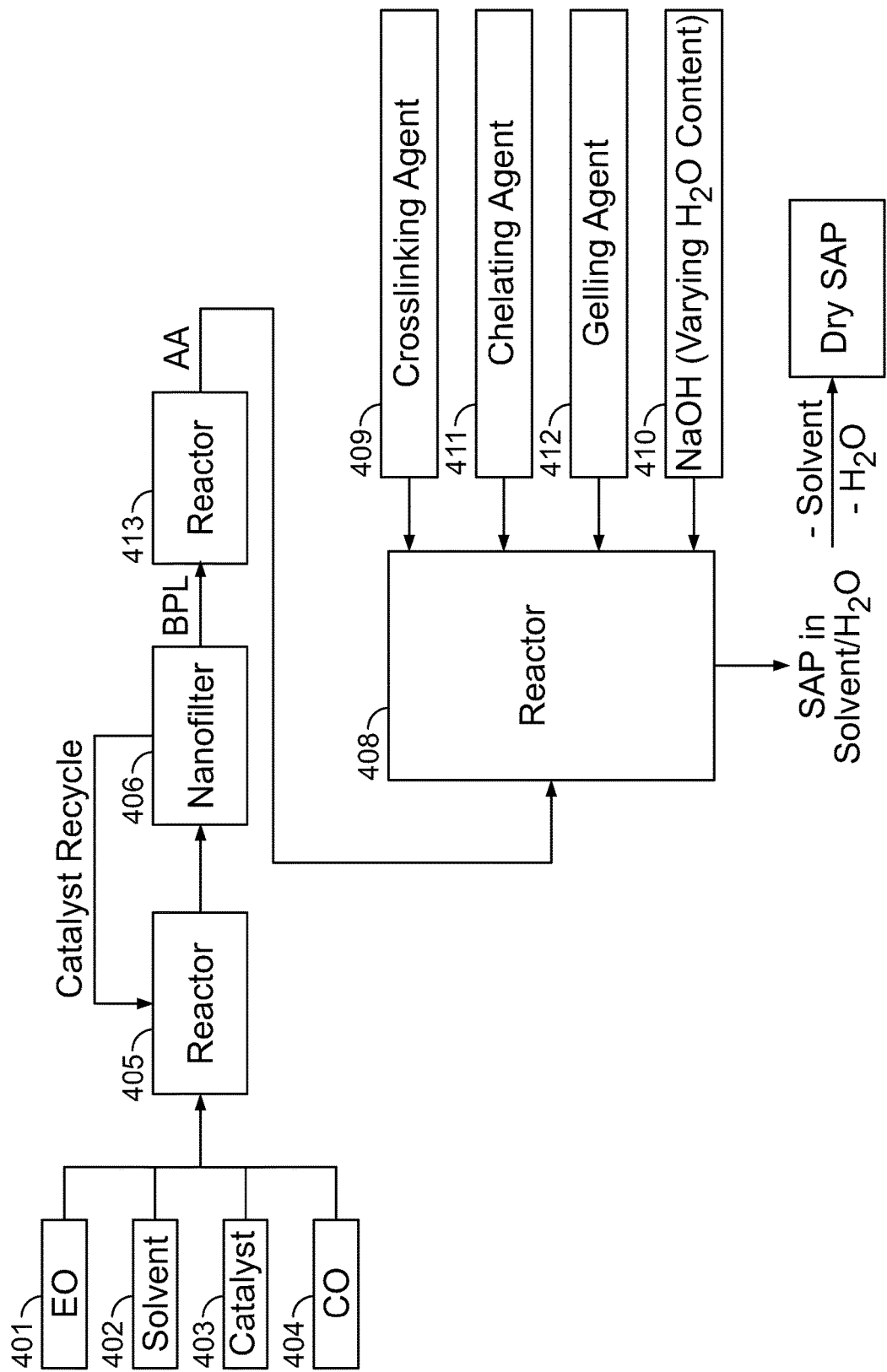
FIG. 4B is an exemplary schematic illustration of a system to produce superabsorbent polymers using sodium hydroxide varying the water content.
Figure 4C:
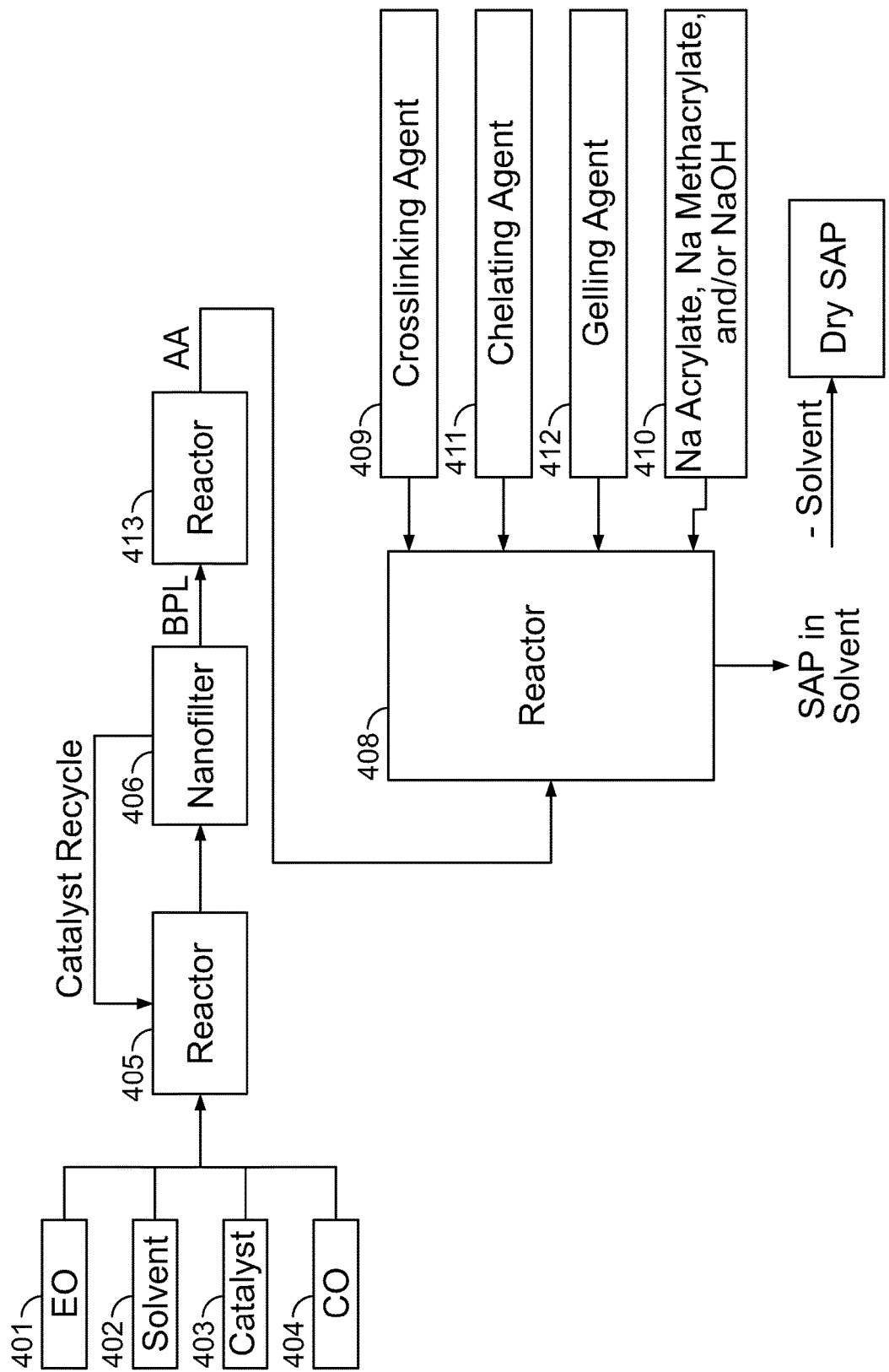
FIG. 4C is an exemplary schematic illustration of a system to produce superabsorbent polymers using sodium acrylate, sodium methacrylate and/or sodium hydroxide.

Referring to FIGS. 4A-4C, exemplary systems to produce SAP from CO and EO are depicted. As previously described with respect to FIG. 1 above, FIGS. 4A-4C can include the same or a similar CO source 404, catalyst source 403, EO source 401, solvent source 402, reactor 405 (a BPL production system), a catalyst recycle stream, and nanofilter 406. In addition, FIG. 4A also includes a BPL purification system depicted as optional distillation column 407 (i.e., similar to the optional distillation column of FIG. 1).

FIGS. 4A-4C also include reactor 413 (an acrylic acid (AA) production system). In reactor 413, the BPL to AA conversion can occur. Reactor 413 can be a single reactor or multiple reactors in series or parallel. For example, reactor 413 can include a polypropiolactone ("PPL") production system (e.g., a plug flow reactor) with a polymerization catalyst and a thermolysis reactor to produce acrylic acid. Reactor 413 can include a catalyst such as a zeolite or other heterogeneous catalyst to help promote the reaction of BPL to AA. In addition, reactor 413 can include a plug flow reactor(s), a loop reactor(s), CSTR(s), or combinations thereof.

Referring to FIG. 4A, the acrylic acid stream, a crosslinking agent from crosslinking agent source 409, sodium hydroxide from sodium-containing component source 410, a chelating agent from chelating agent source 411, and/or a gelling agent from gelling agent source 412 can be fed to reactor 408 (i.e., a superabsorbent polymer production system). Reactor 408 can be a distillation reactor(s), a loop reactor(s), CSTR(s) or combinations thereof. In addition, reactor 408 can be any of the reactors 108 or 208 or 308 described above. In reactor 408, SAP can be produced from AA. In some embodiments, the AA stream, the crosslinking agent, the sodium-containing component, the chelating agent, and/or the gelling agent can be mixed prior to being fed into the distillation reactor. For example, prior to reactor 408, the AA stream and the sodium-containing component can be combined such that they are incorporated as a screw feed into the distillation reactor. In another embodiment, the sodium-containing component and the crosslinking agent can be combined prior to being fed into the distillation reactor. After reactor 408 in FIG. 4A, an SAP stream can be formed.

Referring to FIG. 4B, the acrylic acid stream, a crosslinking agent from crosslinking agent source 409, sodium hydroxide from sodium-containing component source 410, a chelating agent from chelating agent source 411, and/or a gelling agent from gelling agent source 412 can be fed to reactor 408. The sodium hydroxide can have a varied water content. Reactor 408 can be a distillation reactor(s), a loop reactor(s), CSTR(s) or combinations thereof. In addition, reactor 408 can be any of the reactors 108 or 208 or 308 described above. In reactor 408, SAP can be produced from AA. In some embodiments, the AA stream, the crosslinking agent, the sodium-containing component, the chelating agent, and/or the gelling agent can be mixed prior to being fed into the distillation reactor. For example, prior to reactor 408, the AA stream and the sodium-containing component can be combined such that they are incorporated as a screw feed into the distillation reactor. In another embodiment, the sodium-containing component and the crosslinking agent can be combined prior to being fed into the distillation reactor. Since FIG. 4B does not include optional distillation column 407, the SAP stream after reactor 408 can include solvent as well as water (from the sodium hydroxide feed). The solvent and the water from the SAP stream can be separated from the SAP by methods known in the art (e.g., distillation) in order to form dry SAP.

Referring to FIG. 4C, the acrylic acid stream; a crosslinking agent from crosslinking agent source 409; sodium acrylate, sodium methacrylate, and/or sodium hydroxide from sodium-containing component source 410; a chelating agent from chelating agent source 411; and/or a gelling agent from gelling agent source 412 can be fed to reactor 408. Reactor 408 can be a distillation reactor(s), a loop reactor(s), CSTR(s) or combinations thereof. In addition, reactor 408 can be any of the reactors 108 or 208 or 308 described above. In reactor 408, SAP can be produced from AA. In some embodiments, the AA stream, the crosslinking agent, the sodium-containing component, the chelating agent, and/or the gelling agent can be mixed prior to being fed into the distillation reactor. For example, prior to reactor 408, the AA stream and the sodium-containing component can be combined such that they are incorporated as a screw feed into the distillation reactor. In another embodiment, the sodium-containing component and the crosslinking agent can be combined prior to being fed into the distillation reactor. Since FIG. 4C does not include optional distillation column 407, the SAP stream after reactor 408 can include solvent. The solvent from the SAP stream can be separated from the SAP by methods known in the art (e.g., distillation) in order to form dry SAP. Reactor 408 in FIGS. 4A-4C can include heat exchangers for efficient cooling.

In yet other variations, the systems provided herein are also configured to manage and integrate heat produced. For example, in some variations of the systems and methods provided herein, steam may be generated in heat transfer equipment (e.g., shell and tube heat exchanger and reactor cooling jacket) via a temperature gradient between process fluid and water/steam. The steam can be used for heat integration between exothermic and endothermic unit operations. In other variations of the systems and methods provided herein, other suitable heat transfer fluids may be used. For example, it is possible to generate low pressure stream in the SAP production process and use that steam in a distillation column. Specifically, the low pressure steam generated can be used to remove low boiling solvent from a BPL or SAP stream.

What is claimed is:

1. A production system for superabsorbent polymers from ethylene oxide and carbon monoxide, comprising:
 a β-propiolactone production system, comprising:
  a first reactor comprising:
   at least one inlet to receive carbon monoxide, ethylene oxide, carbonylation catalyst, and solvent; and
   at least one outlet for a first β-propiolactone stream comprising β-propiolactone, solvent, and carbonylation catalyst;
  a carbonylation catalyst recycling system configured to separate at least a portion of the carbonylation catalyst from the first β-propiolactone stream to produce a second β-propiolactone stream; and
 a superabsorbent polymer production system, comprising:
  a second reactor comprising:
   at least one inlet to receive the second β-propiolactone stream, a crosslinking agent, and a sodium-containing component; and
   at least one outlet for a superabsorbent polymer stream comprising superabsorbent polymer.

2. The production system of claim 1, wherein the second reactor comprises at least one selected from the group of a distillation reactor, a loop reactor, or a continuous stirred-tank reactor.

3. The production system of claim 1, wherein the at least one inlet of the second reactor is further configured to receive a chelating agent.

4. The production system of any of claim 1, wherein the at least one inlet of the second reactor is further configured to receive a gelling agent.

5. The production system of any of claim 1, wherein the sodium-containing component comprises sodium hydroxide, sodium acrylate, or sodium methacrylate, or any combinations thereof.

6. The production system of any of claim 1, further comprising a β-propiolactone purification system between the carbonylation catalyst recycling system and the superabsorbent polymer production system configured to separate at least a portion of the solvent from the second β-propiolactone stream to produce a third β-propiolactone stream which is received by the at least one inlet of the second reactor instead of the second β-propiolactone stream.

7. A production system for superabsorbent polymers, comprising:
a distillation reactor comprising:
at least one inlet to receive β-propiolactone, a crosslinking agent, and a sodium-containing component; and
at least one outlet for a superabsorbent polymer stream comprising superabsorbent polymer.

8. The production system of claim 7, wherein the at least one inlet of the distillation reactor is further configured to receive a chelating agent.

9. The production system of claim 7, wherein the at least one inlet of the distillation reactor is further configured to receive a gelling agent.

10. The production system of any of claim 7, wherein the sodium-containing component comprises sodium hydroxide, sodium acrylate, or sodium methacrylate, or any combinations thereof.

11. The production system of any of claim 7, wherein the β-propiolactone comprises solvent.

12. The production system of any of claim 7, wherein the β-propiolactone and the sodium-containing component are combined prior to entering the distillation reactor.

13. The production system of any of claim 7, wherein the crosslinking agent and the sodium-containing component are combined prior to entering the distillation reactor.

14. The production system of any of claim 7, wherein the distillation reactor further comprises a catalytic material.

15. The production system of any of claim 7, wherein the distillation reactor comprises a separate inlet to receive the β-propiolactone, the crosslinking agent, and the sodium-containing component.

16. A production system for superabsorbent polymers, comprising:
a distillation reactor, comprising:
at least one inlet to receive acrylic acid, a crosslinking agent, and a sodium-containing component; and
at least one outlet for a superabsorbent polymer stream comprising superabsorbent polymer,
wherein the sodium-containing component comprises sodium hydroxide, sodium acrylate, or sodium methacrylate, or any combinations thereof.

17. The production system of claim 16, wherein the acrylic acid and the sodium-containing component are combined prior to entering the distillation reactor.

18. The production system of claim 16, wherein the crosslinking agent and the sodium-containing component are combined prior to entering the distillation reactor.

19. The production system of claim 16, wherein the at least one inlet of the distillation reactor is further configured to receive a catalytic material.

20. The production system of claim 16, wherein the distillation reactor comprises a separate inlet to receive the acrylic acid, the crosslinking agent, and the sodium-containing component.

21. A production system for superabsorbent polymers, comprising:
a loop reactor comprising:
at least one inlet to receive β-propiolactone, a crosslinking agent, and a sodium-containing component; and
at least one outlet for a superabsorbent polymer stream comprising superabsorbent polymer.

22. The production system of claim 21, wherein the at least one inlet of the loop reactor is further configured to receive a chelating agent.

23. The production system of claim 21, wherein the at least one inlet of the loop reactor is further configured to receive a gelling agent.

24. The production system of claim 21, wherein the sodium-containing component comprises sodium hydroxide, sodium acrylate, or sodium methacrylate, or any combinations thereof.

25. The production system of claim 21, wherein the β-propiolactone comprises solvent.

26. The production system of claim 21, wherein the β-propiolactone and the sodium-containing component are combined prior to entering the loop reactor.

27. The production system of claim 21, wherein the crosslinking agent and the sodium-containing component are combined prior to entering the loop reactor.

28. The production system of claim 21, wherein the at least one inlet of the loop reactor is further configured to receive a catalytic material.

29. The production system of claim 21, wherein the at least one inlet of the loop reactor is further configured to receive a diluent.

30. The production system of claim 21, wherein the loop reactor comprises a separate inlet to receive the β-propiolactone, the crosslinking agent, and the sodium☐ containing component.

31. A production system for superabsorbent polymers, comprising:
a loop reactor comprising:
at least one inlet to receive acrylic acid, a crosslinking agent, and a sodium-containing component; and
at least one outlet for a superabsorbent polymer stream comprising superabsorbent polymer,
wherein the sodium-containing component comprises sodium hydroxide, sodium acrylate, or sodium methacrylate, or any combinations thereof.

32. The production system of claim 31, wherein the acrylic acid and the sodium-containing component are combined prior to entering the loop reactor.

33. The production system of claim 31, wherein the crosslinking agent and the sodium-containing component are combined prior to entering the loop reactor.

34. The production system of claim 31, wherein the at least one inlet of the loop reactor is further configured to receive a catalytic material.

35. The production system of claim 31, wherein the at least one inlet of the loop reactor is further configured to receive a diluent.

36. The production system of claim 31, wherein the distillation reactor comprises a separate inlet to receive the acrylic acid, the crosslinking agent, and the sodium-containing component.

37. A production system for superabsorbent polymers from ethylene oxide and carbon monoxide, comprising:

a β-propiolactone production system, comprising:
  a first reactor comprising:
    at least one inlet to receive carbon monoxide, ethylene oxide, carbonylation catalyst, and solvent; and
    at least one outlet for a first β-propiolactone stream comprising β-propiolactone, solvent, and carbonylation catalyst;
  a carbonylation catalyst recycling system configured to separate at least a portion of the carbonylation catalyst from the first β-propiolactone stream to produce a second β-propiolactone stream;
  an acrylic acid production system, comprising:
    at least one inlet to receive the second β-propiolactone stream; and
    at least one outlet for an acrylic acid stream comprising acrylic acid; and
  a superabsorbent polymer production system, comprising:
    a second reactor comprising:
      at least one inlet to receive the acrylic acid stream, a crosslinking agent, and a sodium-containing component; and
      at least one outlet for a superabsorbent polymer stream comprising superabsorbent polymer.

38. The production system of claim 37, wherein the second reactor comprises at least one selected from the group of a distillation reactor, a loop reactor, or a continuous stirred-tank reactor.

39. The production system of claim 37, wherein the at least one inlet of the second reactor is further configured to receive a chelating agent.

40. The production system of claim 37, wherein the at least one inlet of the second reactor is further configured to receive a gelling agent.

41. The production system of claim 37, wherein the sodium-containing component comprises sodium hydroxide, sodium acrylate, or sodium methacrylate, or any combinations thereof.

42. The production system of claim 41, wherein the sodium-containing component comprises sodium hydroxide.

43. The production system of claim 42, wherein the sodium-containing component further comprises water.

44. The production system of claim 37, further comprising a β-propiolactone purification system between the carbonylation catalyst recycling system and the acrylic acid production system configured to separate at least a portion of the solvent from the second β-propiolactone stream to produce a third β-propiolactone stream which is received by the at least one inlet of the acrylic acid production system instead of the second β-propiolactone stream.

45. The production system of claim 37, wherein the superabsorbent polymer stream further comprises solvent.

46. The production system of claim 45, further comprising a superabsorbent polymer purification system configured to separate at least a portion of the solvent from the superabsorbent polymer stream to produce a second superabsorbent polymer stream.

47. The production system of claim 37, wherein the superabsorbent polymer stream further comprises water.

48. The production system of claim 47, further comprising a superabsorbent polymer purification system configured to separate at least a portion of the solvent and water from the superabsorbent polymer stream to produce a second superabsorbent polymer stream.

* * * * *